United States Patent
Anwar et al.

(10) Patent No.: US 7,030,587 B2
(45) Date of Patent: Apr. 18, 2006

(54) CONFIGURATION OF CONVERTER SWITCHES AND MACHINE COILS OF A SWITCHED RELUCTANCE MACHINE

(75) Inventors: Mohammad N. Anwar, Van Buren Township, MI (US); Mehrdad Teimor, Troy, MI (US); Daryl A. Wilson, Ypsilanti, MI (US); Paul F. Turnbull, Canton, MI (US); William Turnbull, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/821,684

(22) Filed: Apr. 9, 2004

(65) Prior Publication Data

US 2005/0225280 A1    Oct. 13, 2005

(51) Int. Cl.
*H02P 1/46* (2006.01)
*H02P 3/18* (2006.01)
*H02P 5/28* (2006.01)
*H02P 7/36* (2006.01)

(52) U.S. Cl. ............. 318/701; 363/56.02; 363/69; 318/696; 318/685

(58) Field of Classification Search ........ 318/700–701, 318/254; 323/220–222, 232; 363/123–132, 363/140, 27, 21.12, 13–17, 73, 95–98, 80–84, 363/89, 90, 50–56.02
See application file for complete search history.

(56) References Cited

U.S. PATENT DOCUMENTS

| | | | |
|---|---|---|---|
| 3,967,173 A | | 6/1976 | Stich |
| 4,290,001 A | | 9/1981 | Espelage |
| 4,337,429 A | | 6/1982 | Stuart |
| 4,574,340 A | | 3/1986 | Baker |
| 4,860,184 A | * | 8/1989 | Tabisz et al. ............. 363/17 |
| 4,864,479 A | * | 9/1989 | Steigerwald et al. ....... 363/17 |
| 4,953,068 A | * | 8/1990 | Henze ..................... 363/17 |
| 5,132,889 A | * | 7/1992 | Hitchcock et al. ........ 363/17 |
| 5,157,592 A | * | 10/1992 | Walters .................. 363/17 |
| 5,172,309 A | | 12/1992 | DeDoncker et al. |
| 5,294,875 A | | 3/1994 | Reddy |
| 5,450,306 A | | 9/1995 | Garces et al. |
| 5,539,630 A | * | 7/1996 | Pietkiewicz et al. ....... 363/17 |
| 5,640,073 A | | 6/1997 | Ikeda et al. |
| 5,646,836 A | * | 7/1997 | Sadarnac et al. .......... 363/98 |
| 5,657,212 A | * | 8/1997 | Poon et al. ............... 363/17 |
| 5,659,452 A | | 8/1997 | Blackburn |
| 5,708,576 A | * | 1/1998 | Jones et al. ........... 363/56.03 |
| 5,808,879 A | * | 9/1998 | Liu et al. ................ 363/17 |
| 5,838,558 A | * | 11/1998 | Tan et al. ................ 363/91 |
| 5,894,210 A | | 4/1999 | Brown et al. |

(Continued)

*Primary Examiner*—David Martin
*Assistant Examiner*—Renata McCloud
(74) *Attorney, Agent, or Firm*—Brinks Hofer Gilson & Lione

(57) ABSTRACT

A system for controlling a switch reluctance machine is provided. The system includes multiple phases located in the switch reluctance machine, each phase having multiple machine coils. Each machine coil is independently connected to a positive side switch circuit and a negative side switch circuit. Each positive side switch circuit is in electrical parallel connection with the other positive side switch circuits, and configured to control the flow of current through the machine coil to which it is connected. Similarly, the negative side switch circuits are connected in electrical parallel and configured to control the flow of current through the machine coil to which they are connected. The positive side and negative side switch circuits may be provided in a buck boost configuration or two half bridge configurations.

27 Claims, 3 Drawing Sheets

U.S. PATENT DOCUMENTS

| | | | |
|---|---|---|---|
| 5,923,152 A * | 7/1999 | Guerrera | 323/222 |
| 6,016,258 A * | 1/2000 | Jain et al. | 363/17 |
| 6,037,740 A | 3/2000 | Pollock et al. | |
| 6,051,942 A * | 4/2000 | French | 318/254 |
| 6,061,252 A * | 5/2000 | Hosotani | 363/16 |
| 6,064,584 A * | 5/2000 | Cornec et al. | 363/95 |
| 6,078,122 A * | 6/2000 | Tang et al. | 310/165 |
| 6,147,886 A * | 11/2000 | Wittenbreder | 363/95 |
| 6,232,731 B1 | 5/2001 | Chapman | |
| 6,272,023 B1 * | 8/2001 | Wittenbreder | 363/16 |
| 6,307,345 B1 * | 10/2001 | Lewis | 318/696 |
| 6,320,763 B1 * | 11/2001 | Hosotani | 363/16 |
| 6,353,547 B1 * | 3/2002 | Jang et al. | 363/132 |
| 6,356,462 B1 * | 3/2002 | Jang et al. | 363/17 |
| 6,359,412 B1 * | 3/2002 | Heglund | 318/701 |
| 6,392,902 B1 * | 5/2002 | Jang et al. | 363/17 |
| 6,483,724 B1 * | 11/2002 | Blair et al. | 363/17 |
| 6,606,257 B1 * | 8/2003 | Bourdillon | 363/21.12 |
| 6,653,808 B1 * | 11/2003 | Inagaki et al. | 318/432 |
| 6,785,151 B1 * | 8/2004 | Ingman et al. | 363/91 |
| 6,836,414 B1 * | 12/2004 | Batarseh et al. | 363/17 |

* cited by examiner

CONFIGURATION OF CONVERTER SWITCHES AND MACHINE COILS OF A SWITCHED RELUCTANCE MACHINE

BACKGROUND

1. Field of the Invention

The present invention generally relates to a converter switch circuit and coil configuration for a switched reluctance machine.

2. Description of Related Art

Many converter switch circuits have been designed for interfacing with switch reluctance machines. Switched reluctance machines (SRM) may require a large driving current based on the application and performance parameters of the SRM. If the SRM requires a high current draw, special high current electronic components must be used. Often, the high current components must be located on a separate board from low power electronics to minimize radio frequency interference and provide for proper heat dissipation.

One solution for providing higher current flow to switch reluctance machines while utilizing low power electronic components includes using several smaller discrete components in a parallel configuration to provide sufficient current flow to operate the switched reluctance machine. The parallel configuration allows the use of more commercially available components and reduces the overall cost of the electronics. In addition, the heat dissipation can be spread across multiple components allowing for a shared circuit board between the converter switch circuit and other low power electronics. Further, smaller parallel power switches provide better flexibility to integrate the motor and converter in one enclosure to provide improved space optimization.

However, one problem encountered with parallel power switches is that current sharing problems may arise. Even with matching the characteristics of the power switches, the power switches may not turn on or off at exactly the same time. The switching delay between the parallel power switches forces one of the power switches to carry much more than the maximum rated current during the delay time. The current through the switch that turns on earlier will be at least twice the normal current. This will cause more heat on the early power switch and will eventually damage the switch. The unbalanced sharing of current between parallel power switches, even for a short time, may cause power switch failures and ultimately destroy the converter itself. The damage of the first power switch overloads the next switch in parallel, and so on, creating a chain reaction until the whole converter is destroyed. Breakdown may be stopped, if the fault can be detected and the converter can be shut down very quickly. However, it is very difficult to detect the fault and shut off the converter in time. Another way to prevent the chain reaction breakdown of the power switches is to choose oversize components and heat sinks. However, using oversized components negatively affects cost and assembly complexity.

In view of the above, it is apparent that there exists a need for an improved converter switch circuit for a switched reluctance machine.

SUMMARY

In satisfying the above need, as well as overcoming the enumerated drawbacks and other limitations of the related art, the present invention provides a system for controlling a switch reluctance machine.

The system includes multiple phases located in the switch reluctance machine, each phase having multiple machine coils. Each machine coil is independently connected to a positive side switch circuit and a negative side switch circuit. Each positive side switch circuit is in electrical parallel connection with the other positive side switch circuits, and configured to control the flow of current through the machine coil to which it is connected. Similarly, the negative side switch circuits are connected in electrical parallel and configured to control the flow of current through the machine coil to which they are connected. The positive side switch circuit may be provided in a buck configuration and negative side switch circuits may be provided in a boost configuration or both switch circuits may be provided in half bridge configurations.

In the buck and boost configuration, each positive side switch or buck configuration circuit includes a power switch and a diode, the positive side switch circuit being in electrical connection with a positive side of the machine coil between the power switch and diode. Similarly, each negative side switch circuit or boost configuration includes a power switch and a diode, the negative side switch circuit being in electrical connection with a negative side of the machine coil between the power switch and diode. Preferably, the power switches are N-channel MOSFETs, however other power switches may be used. A capacitor is in electrical parallel connection with the power switch and diode and mounted in close proximity therewith to provide DC line filtering and snubbing of switch-off transients.

In the described configuration, power switches and machine coils provide all the benefits of the parallel switching but many of the problems associated with current sharing are eliminated. The switches and diodes form individual buck or boost configurations for each machine coil, instead of conventional paralleling of discrete switches. In this arrangement, the machine coils are not paralleled inside the machine, as is typically provided. Instead, two terminals per machine coil are accessible outside of the machine. Each positive terminal is connected to a buck configuration and each negative terminal is connected to a boost configuration.

In the half bridge configuration, each positive side and negative side switch circuit includes two power switches. The positive side switch circuit being in electrical connection with a positive side of the machine coil between the two power switches. Similarly, the negative side switch circuit being in electrical connection with a negative side of the machine coil between the two power switches. Preferably, the power switches are N-channel MOSFETs, however other power switches may be used. A capacitor is in electrical parallel connection with the two power switches and mounted in close proximity therewith to provide DC line filtering and snubbing of switch-off transients.

As described above, the machine coils are not paralleled inside the machine, as is typically provided. Instead, two terminals per machine coil are accessible outside of the machine. Each positive terminal is connected to a half bridge configuration and each negative terminal is connected to a separate half bridge configuration.

Further objects, features and advantages of this invention will become readily apparent to persons skilled in the art after a review of the following description, with reference to the drawings and claims that are appended to and form a part of this specification.

DETAILED DESCRIPTION

Figure 1:
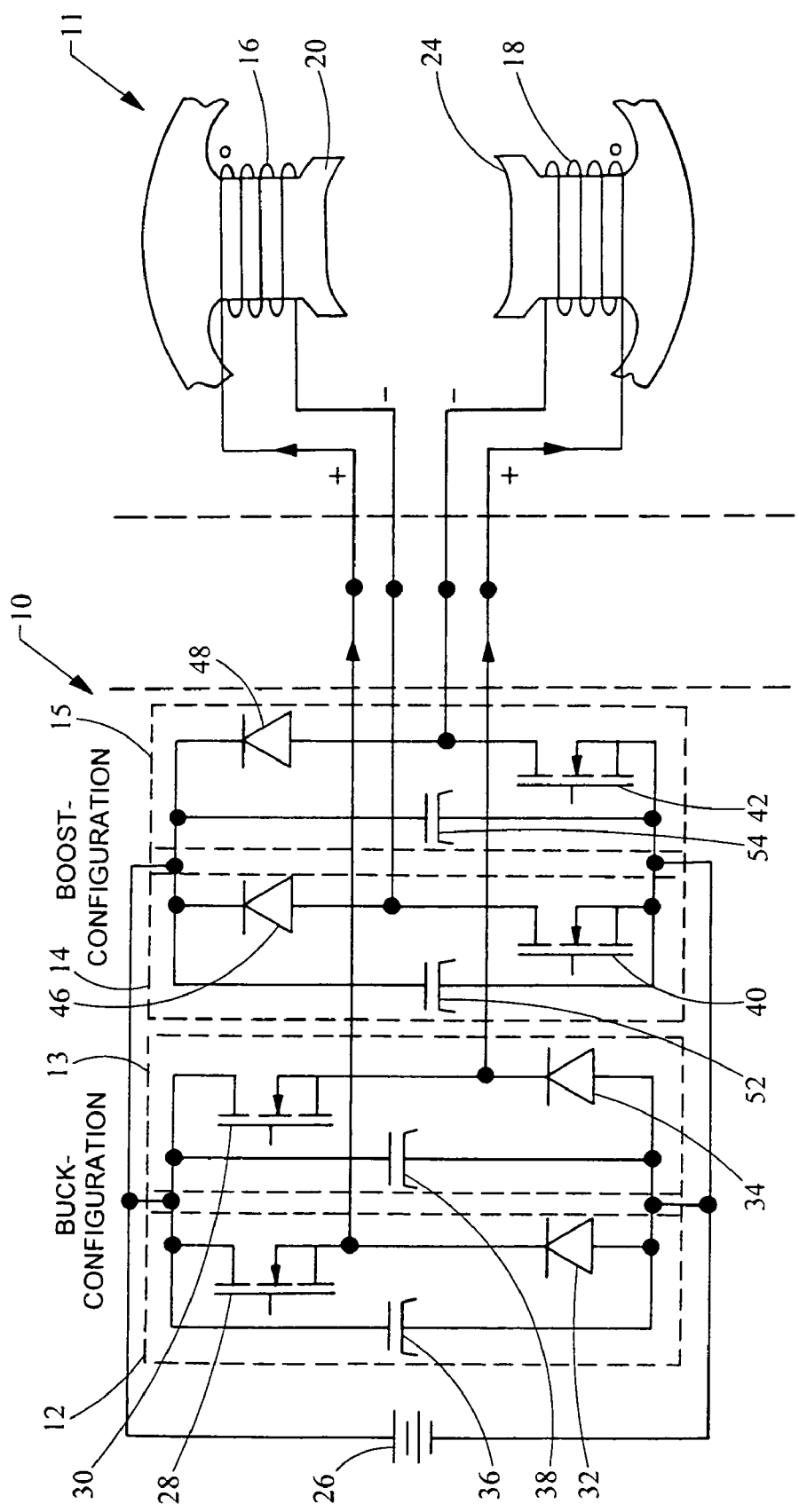
FIG. 1 is a schematic of a converter switch circuit including a buck and a boost configuration in accordance with the present invention.

Now referring to FIG. 1, a converter circuit 10 for controlling a SRM 11 embodying the principles of the present invention is provided. The converter circuit 10 includes a first positive side switch circuit 12, a second positive side switch circuit 13, a first negative side switch circuit 14, a second negative side switch circuit 15, and a power source 26.

A phase of the SRM 11 includes a first machine coil 16 and a second machine coil 18. The first machine coil 16 is wrapped around a first magnetic core 20, while the second machine coil 18 is wrapped around a second magnetic core 24 located opposite the first magnetic core 20.

The first positive side switch circuit 12 is in electrical communication with the positive side of the first machine coil 16 and the first negative side switch circuit 14 is in communication with the negative side of the first machine coil 16. Similarly, the second positive side switch circuit 13 is in communication with the positive side of the second machine coil 18 and the second negative side switch circuit 15 is in communication with the negative side of the second machine coil 18.

The first positive side switch circuit 12 includes power switch 28 and a diode 32. Power switch 28 is preferably an N-channel MOSFET, although, a P-channel MOSFET or other more complex power switches such as IGBTs or other commonly known switches may be used. The drain of power switch 28 is connected to the first side of the power source 26. The source of power switch 28 is connected to a positive side of the first machine coil 16 and a cathode of diode 32. To complete the first positive side switch circuit, the anode of diode 32 is connected to the second side of the power source 26. The gate of power switch 28 is connected to a gate driver (not shown). To reduce parasitic bus inductance and switching transients, capacitor 36 is connected between the drain of power switch 28 and the anode of diode 32.

The second positive side switch circuit 13 includes a second power switch 30 and a diode 34. Power switch 30 is preferably an N-channel MOSFET, although, a P-channel MOSFET or other more complex power switches such as IGBTs or other commonly known switches may be used. The drain of power switch 30 is connected to the first side of the power source 26. The source of power switch 30 is connected to a positive side of the second machine coil 18 and a cathode of diode 34. To complete the first positive side switch circuit, the anode of diode 34 is connected to the second side of the power source 26. The gate of power switch 30 is connected to the gate driver. To reduce parasitic bus inductance and switching transients, capacitor 36 is connected between the drain of power switch 30 and the anode of diode 34.

The first negative side switch circuit 14 includes a third power switch 40 and a diode 46. The cathode of diode 46 is connected to the power source 26. The anode of diode 46 is connected to the negative side of the first machine coil 16 and the drain of power switch 40. The source of power switch 40 is connected to the second side of the power source 26 to complete the first negative side switch circuit. To reduce parasitic bus inductance and switching transients, capacitor 52 is connected between the cathode of diode 46 and the source of power switch 40.

The second negative side switch circuit 15 includes a fourth power switch 42 and a diode 48. The cathode of diode 48 is connected to the power source 26. The anode of diode 48 is connected to the negative side of the second machine coil 18 and the drain of power switch 42. The source of power switch 42 is connected to the second side of the power source 26 to complete the second negative side switch circuit. To reduce parasitic bus inductance and switching transients, capacitor 54 is connected between the cathode of diode 48 and the source of power switch 42.

Each positive terminal of the SRM 11 is connected to a buck configuration, such as positive side power switch 12 and 13, and each negative terminal is connected to a boost configuration, such as negative side power switch 14 and 15. In addition, the same gate pulses are provided for power switch 28 and 30. Similarly, the gate pulses for power switches 40, 42 are also the same. Therefore, the configuration provides individual parallel buck and boost configurations for each of the machine coils improving reliability and fault tolerance of the circuit. The operation and current through each machine coil, as well as, the corresponding power switches do not depend on the current through other machine coils and their corresponding switches. Therefore, the current through each switch is limited by $R_p$, (phase resistance of each coil). However, if discrete components were used in parallel the current would have been limited by $R_p/2$ (two coils in parallel), and if the power switches did not turn on at exactly the same time, the current through one of the power switches would exceed its limit.

Using the configuration described above, during the time period where one of the switches is not turned on, the machine coil is not energized. The machine, in this condition, may suffer from a load unbalance and its performance may be compromised thereby producing less torque or having more torque ripples. However, the performance deterioration is not significant considering the short time period and the potential reliability benefits of the provided configuration. In addition, this configuration provides improved packaging options. The individual link capacitor for each buck and boost configuration may be located within a close proximity of the power switches. Further, the same capacitor can be used for effective DC line filtering, as well as, for snubbing the switch off transients of the corresponding switches.

Figure 2:
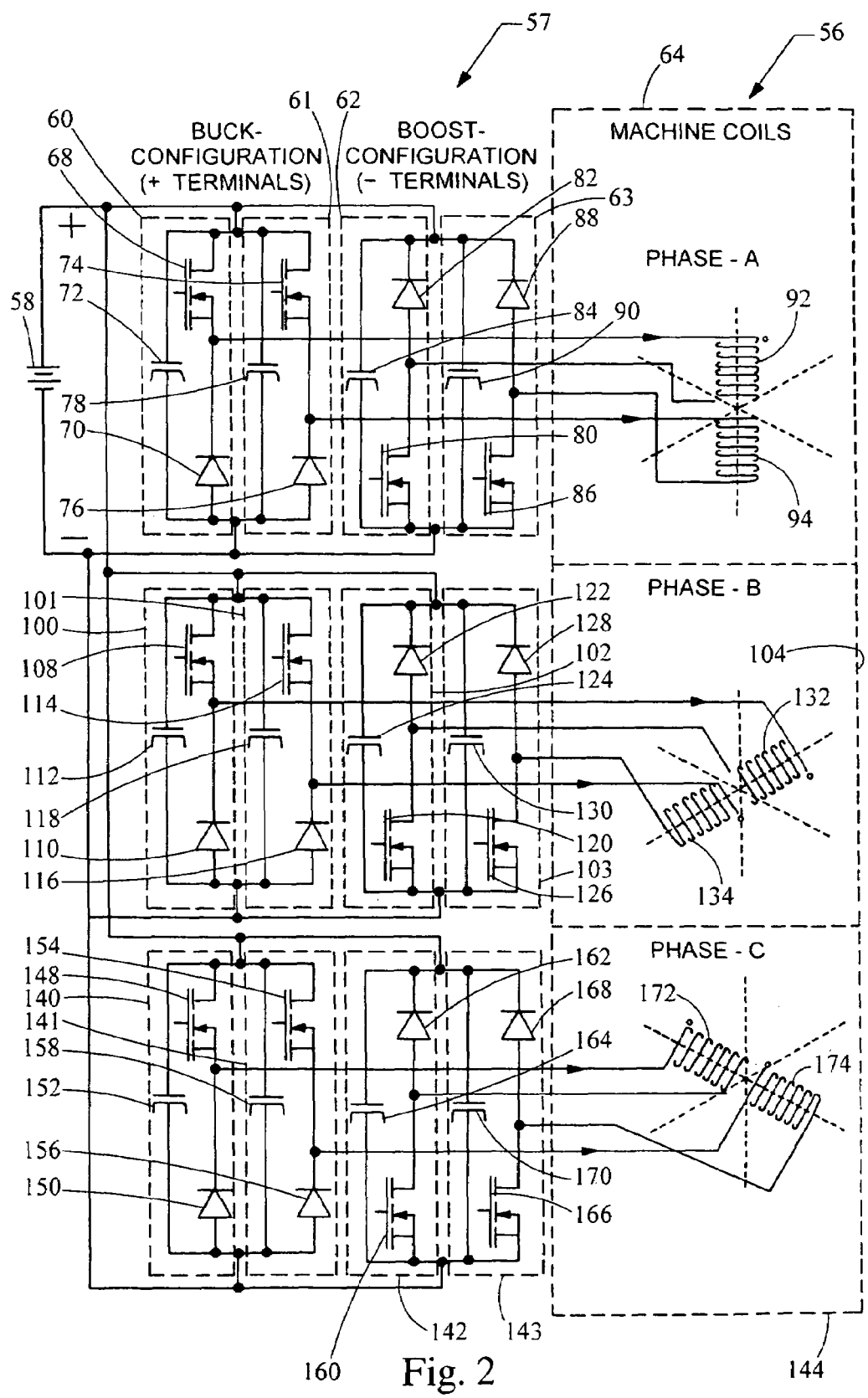
FIG. 2 is a schematic of a converter switch circuit for 3-phase 6/4 switched reluctance machine in accordance with the present invention.

Now referring to FIG. 2, a converter switching circuit 57 embodying the principles of the present invention is provided for switching a three phase 6/4 (six stator poles and 4 rotor poles) switched reluctance machine 56.

Positive side switch circuits 60, 61 and negative side switch circuits 62, 63 provide switching for phase A coil configuration 64. For controlling the first phase A machine coil 92, the positive side switch circuit 60 includes power switch 68 and diode 70. The drain of power switch 68 is connected to the first side of power source 58 and the anode of diode 70 is connected to the second side of power source 58. The source of power switch 68 is connected to a first side of the first phase A machine coil 92 and the cathode of diode 70. To reduce parasitic bus inductance and switching transients, capacitor 72 is connected between the drain of power switch 68 and the anode of diode 70.

The negative side switch circuit 62 includes a power switch 80 and a diode 82. The cathode of diode 82 is connected to a first side the power source 58, and the source of power switch 80 is connected to the second side of power source 58. The anode of diode 82 is connected to the second side of the first phase A machine coil 92 and the drain of power switch 80. To reduce parasitic bus inductance and switching transients, capacitor 84 is connected between the cathode of diode 82 and the source of power switch 80.

For controlling the second phase A machine coil 94, positive side switch circuit 60 includes power switch 74 and a diode 76. The drain of power switch 74 is connected to the first side of the power source 58 and the anode of diode 76 is connected to the second side of power source 58. The source of power switch 74 is connected to a first side of the second phase A machine coil 94 and a cathode of diode 76. To reduce parasitic bus inductance and switching transients, capacitor 78 is connected between the drain of power switch 74 and the anode of diode 76.

The negative side switch circuit 63 includes a power switch 86 and a diode 88. The cathode of diode 88 is connected to a first side the power source 58, and the source of power switch 86 is connected to the second side of power source 58. The anode of diode 88 is connected to the second side of the second phase A machine coil 94 and the drain of power switch 86. To reduce parasitic bus inductance and switching transients, capacitor 90 is connected between the cathode of diode 88 and the source of power switch 86.

Positive side switch circuits 100, 101 and negative side switch circuits 102, 103 provide switching for phase B coil configuration 104. For controlling the first phase B machine coil 132, the positive side switch circuit 100 includes power switch 108 and diode 110. The drain of power switch 108 is connected to the first side of power source 58 and the anode of diode 110 is connected to the second side of power source 58. The source of power switch 108 is connected to a first side of the first phase B machine coil 132 and the cathode of diode 110. To reduce parasitic bus inductance and switching transients, capacitor 112 is connected between the drain of power switch 108 and the anode of diode 110.

The negative side switch circuit 103 includes a power switch 120 and a diode 122. The cathode of diode 122 is connected to a first side the power source 58, and the source of power switch 120 is connected to the second side of power source 58. The anode of diode 122 is connected to the second side of the first phase B machine coil 132 and the drain of power switch 120. To reduce parasitic bus inductance and switching transients, capacitor 124 is connected between the cathode of diode 122 and the source of power switch 120.

For controlling the second phase B machine coil 134, positive side switch circuit 101 includes power switch 114 and a diode 116. The drain of power switch 114 is connected to the first side of the power source 58 and the anode of diode 116 is connected to the second side of power source 58. The source of power switch 114 is connected to a first side of the second phase B machine coil 134 and a cathode of diode 116. To reduce parasitic bus inductance and switching transients, capacitor 118 is connected between the drain of power switch 114 and the anode of diode 116.

The negative side switch circuit 103 includes a power switch 126 and a diode 128. The cathode of diode 128 is connected to a first side the power source 58, and the source of power switch 126 is connected to the second side of power source 58. The anode of diode 128 is connected to the second side of the second phase B machine coil 134 and the drain of power switch 126. To reduce parasitic bus inductance and switching transients, capacitor 130 is connected between the cathode of diode 128 and the source of power switch 126.

Positive side switch circuits 140, 141 and negative side switch circuits 142, 143 provide switching for phase C coil configuration 144. For controlling the first phase C machine coil 172, the positive side switch circuit 140 includes power switch 148 and diode 150. The drain of power switch 148 is connected to the first side of power source 58 and the anode of diode 150 is connected to the second side of power source 58. The source of power switch 148 is connected to a first side of the first phase C machine coil 172 and the cathode of diode 150. To reduce parasitic bus inductance and switching transients, capacitor 152 is connected between the drain of power switch 148 and the anode of diode 150.

The negative side switch circuit 142 includes a power switch 160 and a diode 162. The cathode of diode 162 is connected to a first side the power source 58, and the source of power switch 160 is connected to the second side of power source 58. The anode of diode 162 is connected to the second side of the first phase C machine coil 172 and the drain of power switch 160. To reduce parasitic bus inductance and switching transients, capacitor 164 is connected between the cathode of diode 162 and the source of power switch 160.

For controlling the second phase A coil 174, positive side switch circuit 141 includes power switch 154 and a diode 156. The drain of power switch 154 is connected to the first side of the power source 58 and the anode of diode 156 is connected to the second side of power source 58. The source of power switch 154 is connected to a first side of the second phase C machine coil 174 and a cathode of diode 156. To reduce parasitic bus inductance and switching transients, capacitor 158 is connected between the drain of power switch 154 and the anode of diode 156.

The negative side switch circuit 143 includes a power switch 166 and a diode 168. The cathode of diode 168 is connected to a first side the power source 58, and the source of power switch 166 is connected to the second side of power source 58. The anode of diode 168 is connected to the second side of the second phase C machine coil 174 and the drain of power switch 166. To reduce parasitic bus inductance and switching transients, capacitor 170 is connected between the cathode of diode 168 and the source of power switch 166.

Figure 3:
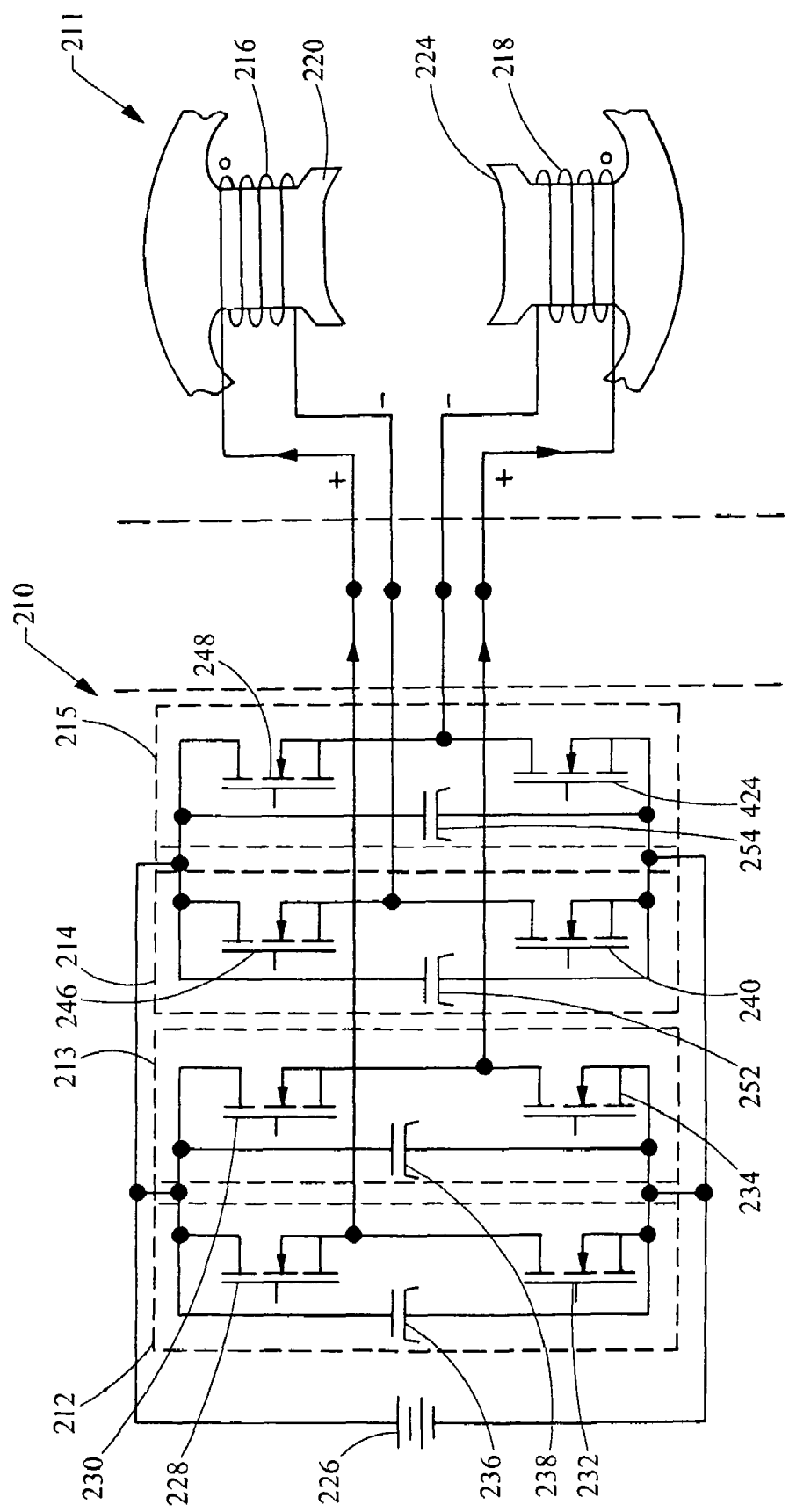
FIG. 3 is a schematic of a converter switch circuit including two half bridge configurations in accordance with the present invention.

Now referring to FIG. 3, a converter circuit 210 for controlling a SRM 211 embodying the principles of the present invention is provided. The converter circuit 210 includes a first positive side switch circuit 212, a second positive side switch circuit 213, a first negative side switch circuit 214, a second negative side switch circuit 215, and a power source 226.

SRM 211 includes a first machine coil 216 and a second machine coil 218. The first machine coil 216 is wrapped around a first magnetic core 220, while the second machine coil 218 is wrapped around a second magnetic coil 224 located opposite the first magnetic core 220.

The first positive side switch circuit 212 is in electrical communication with the positive side of the first machine coil 216 and the first negative side switch circuit 214 is in communication with the negative side of the first machine coil 216. Similarly, the second positive side switch circuit 213 is in communication with the positive side of the second machine coil 218 and the second negative side switch circuit 215 is in communication with the negative side of the second machine coil 218.

The first positive side switch circuit 212 includes a first and second power switch 228, 232. The first and second power switch 228, 232 are preferably an N-channel MOSFET, although, a P-channel MOSFET or other more complex power switches such as IGBTs or other commonly known switches may be used. The drain of power switch 228 is connected to the positve side of the power source 226. The source of power switch 228 is connected to a first side of the first machine coil 216 and a drain of power switch 232. To complete the first positive side switch circuit, a source of power switch 232 is connected to the second side of the power source 226. The gate of power switch 228 and 232 are connected to a gate driver (not shown). To reduce parasitic bus inductance and switching transients, capacitor 236 is connected between the drain of power switch 228 and the source of power switch 232.

The second positive side switch circuit 213 includes a third and fourth power switch 230, 234. The third and fourth power switch 230, 232 are preferably an N-channel MOSFET, although, a P-channel MOSFET or other more complex power switches such as IGBTs or other commonly known switches may be used. The drain of power switch 230 is connected to the first side of the power source 226. The source of power switch 230 is connected to a positive side of the second machine coil 218 and a drain of power switch 234. To complete the first positive side switch circuit, a source of power switch 234 is connected to the second side of the power source 226. The gate of power switch 230 and 234 are connected to the gate driver. To reduce parasitic bus inductance and switching transients, capacitor 236 is connected between the drain of power switch 230 and the source of power switch 234.

The first negative side switch circuit 214 includes a fourth and fifth power switch 240, 246. The drain of power switch 246 is connected to the power source 226. A source of power switch 246 is connected to the negative side of the first machine coil 216 and the drain of power switch 240. The source of power switch 240 is connected to the second side of the power source 226 to complete the first negative side switch circuit. To reduce parasitic bus inductance and switching transients, capacitor 252 is connected between the drain of power switch 246 and the source of power switch 240.

The second negative side switch circuit 215 includes a seventh and eighth power switch 242, 248. A drain of power switch 248 is connected to the power source 226. A source of power switch 248 is connected to the negative side of the second machine coil 218 and the drain of power switch 242. The source of power switch 242 is connected to the second side of the power source 226 to complete the second negative side switch circuit. To reduce parasitic bus inductance and switching transients, capacitor 254 is connected between the drain of power switch 248 and the source of power switch 242.

A three phase 6/4 switched reluctance machine can be readily provided as in FIG. 2, by substituting a half bridge configuration into each of the positive side and negative side switch circuits as described above.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A system comprising:
   a switched reluctance machine including a plurality of phases, each phase including a plurality of machine coils;
   a plurality of sets of positive side switch circuits in electrical parallel connection, wherein the positive side switch circuits of each set are each electrically connected to a positive side of a machine coil of the same phase and configured to control the flow of current through the machine coil; and
   a plurality of sets of negative side switch circuits in electrical parallel connection, wherein the negative side switch circuits of each set are each electrically connected to a negative side of a machine coil of the same phase and configured to control the flow of current through the machine coil.

2. The system according to claim 1, wherein each positive side switch circuit includes a first power switch and a first diode, and each negative side switch circuit includes a second power switch and a second diode.

3. The system according to claim 2, wherein the positive side of the machine coil is electrically connected between the first power switch and the first diode.

4. The system according to claim 3, wherein the negative side of the machine coil is electrically connected between the second power switch and the second diode.

5. The system according to claim 2, wherein the first and second power switches are MOSFET's.

6. The system according to claim 5, wherein :he first and second power switches are N-channel MOSFETs.

7. The system according to claim 6, wherein a source of the first power switch is in electrical communication with a cathode of the first diode and a drain of the second power switch is in communication with an anode of the second diode.

8. The system according to claim 7, further comprising a power source, wherein a first side of the power source is in electrical communication with a drain of the first power switch and cathode of the second diode and a second side of the power source is in electrical communication with an anode of the first diode and a source of the second power switch.

9. The system according to claim 5, further comprising a first capacitor in electrical parallel connection with the first power switch and the first diode between a drain of the first power switch and an anode of the first diode.

10. The system according to claim 9, further comprising a second capacitor in electrical parallel connection with the second power switch between a source of the second power switch and a cathode of the second diode.

11. The system according to claim 10, wherein the first capacitor is mounted in close proximity to the first power switch and the second capacitor is mounted in close proximity to the second power switch, wherein the first and second capacitors are configured to provide DC line filtering and snubbing of switch off transients.

12. The system according to claim 1, wherein each positive side switch circuit includes a first and second power switch in electrical series connection and each negative side switch circuit includes a third and fourth power switch in electrical series connection.

13. The system according to claim 12, wherein a positive side of the machine coil is electrically connected between the first and second power switch.

14. The system according to claim 13, wherein a negative side of the machine coil is electrically connected between the third and fourth power switch.

15. The system according to claim 12, wherein the first, second, third, and fourth power switches are MOSFET's.

16. The system according to claim 15, wherein the first, second, third, and fourth power switches are N-channel MOSFETs.

17. The system according to claim 16, wherein a source of the first power switch is in electrical communication with a drain of the second power switch and a drain of the third power switch is in communication with a source of the fourth power switch.

18. The system according to claim 17, further comprising a power source, wherein, a first side of the power source is n electrical communication with a drain of the first power switch and source of the third power switch and a second side of the power source is in electrical communication with a drain of the second power switch and a source of the fourth power switch.

19. The system according to claim 12, further comprising a first capacitor in electrical parallel connection with the first and second power switch between a drain of the first power switch and a source of the second power switch.

20. The system according to claim 19, further comprising a second capacitor in electrical parallel connection with the third and fourth power switch between a source of the third power switch and a drain of the fourth power switch.

21. The system according to claim 20, wherein the first capacitor is mounted in close proximity to the first and second power switch and the second capacitor is mounted in close proximity to the third and fourth power switch, wherein the first and second capacitors are configured to provide DC line filtering and snubbing of switch off transients.

22. A system comprising:
a switched reluctance machine including a plurality of phases, each phase including a plurality of machine coils, the switched reluctance machine having a plurality of magnetic cores, each machine coil being wound around a corresponding magnetic core of the plurality of magnetic cores;
a plurality of sets of positive side switch circuits in electrical parallel connection, wherein the positive side switch circuits of each set are each electrically connected to a machine coil of the same phase, each positive side switch circuit including a first power switch and a first diode, the first power switch being in electrical connection with a positive side of the machine coil between the first power switch and the first diode; and
a plurality of sets of negative side switch circuits in electrical parallel connection, wherein the negative side switch circuits of each set are each electrically connected to a machine coil of the same phase, each negative side switch circuit including a second power switch and a second diode, the second power switch being in electrical connection with a negative side of the machine coil between the second power switch and the second diode.

23. The system according to claim 22, wherein the first and second power switches are MOSFET's.

24. The system according to claim 23, wherein the first and second power switches are N-channel MOSFETs.

25. The system according to claim 24, wherein a source of the first power switch is in electrical communication with a cathode of the first diode and a drain of the second power switch is in communication with a anode of the second diode.

26. The system according to claim 25, further comprising a power source, wherein a first side of the power source is in electrical communication with a drain of the first power switch and cathode of the second diode and a second side of the power source is in electrical communication with an anode of the first diode and a source of the second power switch.

27. The system according to claim 22, further comprising a first capacitor in electrical parallel connection with the first and second power switch between a drain of the first power switch and a source of the second power switch.

* * * * *

UNITED STATES PATENT AND TRADEMARK OFFICE
CERTIFICATE OF CORRECTION

| | | |
|---|---|---|
| PATENT NO. | : 7,030,587 B2 | Page 1 of 1 |
| APPLICATION NO. | : 10/821684 | |
| DATED | : April 18, 2006 | |
| INVENTOR(S) | : Mohammad N. Anwar et al. | |

It is certified that error appears in the above-identified patent and that said Letters Patent is hereby corrected as shown below:

In the Claims

Column 9, in claim 18, line 16, before "electrical communication with" delete "n" and substitute --in-- in its place.

Signed and Sealed this

Twenty-eighth Day of November, 2006

JON W. DUDAS
*Director of the United States Patent and Trademark Office*